United States Patent
Tegeler et al.

(10) Patent No.: US 10,056,815 B2
(45) Date of Patent: Aug. 21, 2018

(54) LINEAR DRIVE SYSTEM FOR DOWNHOLE APPLICATIONS

(71) Applicant: BAKER HUGHES INCORPORATED, Houston, TX (US)

(72) Inventors: Sebastian Tegeler, Hannover (DE); Steffen Toscher, Houston, TX (US); Otto N. Fanini, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 573 days.

(21) Appl. No.: 14/502,338

(22) Filed: Sep. 30, 2014

(65) Prior Publication Data
US 2016/0090787 A1   Mar. 31, 2016

(51) Int. Cl.
| | | |
|---|---|---|
| *E21B 4/04* | (2006.01) | |
| *H02K 41/03* | (2006.01) | |
| *E21B 4/18* | (2006.01) | |
| *H02K 1/12* | (2006.01) | |

(52) U.S. Cl.
CPC ............ *H02K 41/031* (2013.01); *E21B 4/04* (2013.01); *E21B 4/18* (2013.01); *H02K 1/12* (2013.01)

(58) Field of Classification Search
CPC ...................................................... H02K 5/12
USPC ................................ 310/12.01, 12.15, 12.24
See application file for complete search history.

(56) References Cited

U.S. PATENT DOCUMENTS

| | | | | | |
|---|---|---|---|---|---|
| 3,624,575 | A | * | 11/1971 | Muller | H01F 7/081 335/281 |
| 5,734,209 | A | * | 3/1998 | Hallidy | E21B 43/128 310/12.04 |
| 6,003,606 | A | * | 12/1999 | Moore | E21B 4/18 166/381 |
| 6,153,951 | A | * | 11/2000 | Morita | F04B 35/045 310/12.19 |

(Continued)

FOREIGN PATENT DOCUMENTS

| | | | | |
|---|---|---|---|---|
| GB | 2079068 A | * | 1/1982 | ............ H02K 41/03 |
| WO | 2013-131008 A1 | | 9/2013 | |

OTHER PUBLICATIONS

PCT/US2015/053137—International Search Report dated Jan. 13, 2016.

(Continued)

*Primary Examiner* — Kenneth L Thompson
*Assistant Examiner* — Steven A MacDonald
(74) *Attorney, Agent, or Firm* — Mossman, Kumar & Tyler, PC (57) ABSTRACT

An apparatus for use in a borehole may include a rotor having at least one set of magnetic elements and a cylindrical stator having a winding flowing current in a direction transverse to a long axis of the stator. The polarity of each magnetic element of the rotor may be arranged to alternate along a long axis of the rotor. The stator may be in sliding engagement with the rotor and have a core formed at least partially of laminations aligned along a plane co-planar with the long axis of the stator. Energizing the winding principally causes relative sliding between the rotor and the stator. A method for performing an operation in a borehole includes forming a well tool having at least one linear motor as described above, conveying the linear motor into the borehole, and operating a well tool by activating the linear motor.

19 Claims, 6 Drawing Sheets

(56) References Cited

U.S. PATENT DOCUMENTS

| | | | |
|---|---|---|---|
| 8,853,894 B2* | 10/2014 | Fick | H02K 3/28 310/12.14 |
| 2003/0173162 A1* | 9/2003 | Hestermann | H02K 41/031 188/38 |
| 2004/0061384 A1* | 4/2004 | Yatsuzuka | H02K 33/16 310/13 |
| 2004/0232777 A1* | 11/2004 | Yumita | F04B 17/042 310/12.01 |
| 2005/0006959 A1* | 1/2005 | Hoppe | H02K 41/03 310/12.16 |
| 2005/0082055 A1* | 4/2005 | Bloom | E21B 4/18 166/213 |
| 2006/0151212 A1 | 7/2006 | Doering et al. | |
| 2006/0186977 A1* | 8/2006 | Ito | H02K 3/525 335/220 |
| 2007/0007043 A1* | 1/2007 | Dewey | E21B 10/62 175/75 |
| 2007/0295515 A1* | 12/2007 | Veneruso | E21B 34/066 166/386 |
| 2011/0002799 A1 | 1/2011 | McVicker et al. | |
| 2012/0024543 A1* | 2/2012 | Head | E21B 43/128 166/382 |
| 2013/0038144 A1* | 2/2013 | McAleese | H02K 41/02 310/12.21 |
| 2014/0116779 A1 | 5/2014 | Fraser | |
| 2015/0288270 A1* | 10/2015 | McAleese | H02K 41/02 310/12.22 |

OTHER PUBLICATIONS

Jastrzembski, J.-P., Ponick, B. (2010) : Different Methods for Reducing Detent Force in a Permanent Magnet Linear Synchronous Motor, IECON 2010, Phoenix, Arizona (USA).

Takacs, Gabor (2001): Ways to Decrease Production Costs for Sucker-Rod Pumping, Oil and Gas Business. Electronic Scientific journal. Issue Feb. 2001.

* cited by examiner

LINEAR DRIVE SYSTEM FOR DOWNHOLE APPLICATIONS

CROSS-REFERENCE TO RELATED APPLICATIONS

None.

BACKGROUND OF THE DISCLOSURE

1. Field of the Disclosure

This disclosure relates generally to oilfield downhole tools and more particularly to linear motors for downhole applications.

2. Background of the Art

A variety of well tools are used during the construction, completion, and recompletion, workover, remediation, operation, and eventual abandonment of a well. For example, drilling assemblies, or "Bottom Hole Assemblies" or ("BHA"), may be used to form a borehole. BHA's include complex equipment such as steering units, thrusters, tractors, adjustable stabilizers, etc. Completion activities may utilize sliding sleeve valves, swages, fishing tools, extraction devices, etc. Also, during production, devices such as pumps may be positioned downhole to facilitate hydrocarbon recovery.

The present disclosure addresses the need for efficient drive systems for these and other downhole devices and equipment.

SUMMARY OF THE DISCLOSURE

In aspects, the present disclosure provides an apparatus for use in a borehole. The apparatus may include a rotor having at least one set of magnetic elements and a cylindrical stator having a winding flowing current in a direction transverse to a long axis of the stator. The polarity of each magnetic element of the rotor may be arranged to alternate along a long axis of the rotor. The stator may be in sliding engagement with the rotor. The stator may have a core formed at least partially of laminations aligned along a plane co-planar with the long axis of the stator. Energizing the winding principally causes relative sliding between the rotor and the stator.

In aspects, the present disclosure also provides a method for performing an operation in a borehole. The method may include forming at least one linear motor as described above, conveying the linear motor into the borehole; and operating a well tool by activating the linear motor.

Examples of certain features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION OF THE DISCLOSURE

Aspects of the present disclosure provide electromechanical linear drives that enable advanced motion and actuation for numerous downhole applications. In embodiments, the linear drives of the present disclosure are suited for the borehole environment and in particular the generally circular geometries and limited space.

Figure 1A:
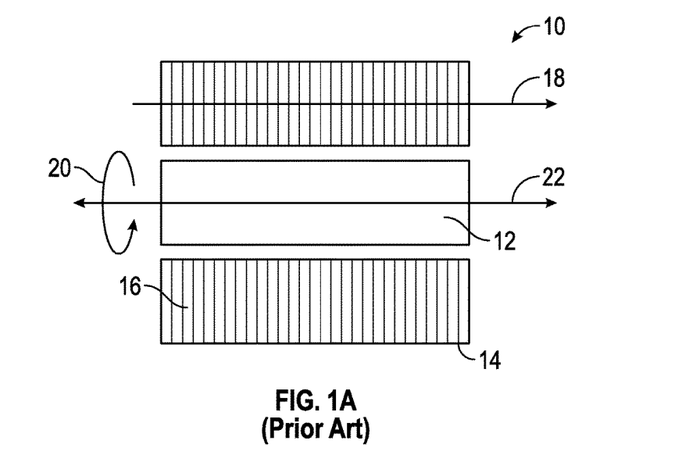
FIG. 1A schematically illustrates a prior art rotary electric motor.

To better understand the teachings of the present disclosure, reference is made to a conventional rotary electric motor 10 shown in FIG. 1A. The motor 10 has a rotor 12 disposed inside an active stator 14. The rotor 12 may include permanent magnets (not shown). The stator 14 includes a core formed of laminations 16. The windings (not shown) associated with the stator 14 direct current flowing in the positive direction shown with arrow 18 along an axial view of motor 10. The laminations 16 reduce hysteresis and eddy currents, resulting from changes in the magnetic flux, by providing layers of insulation transversely aligned to the flow of current along the direction of arrow 18. In a conventional manner, when current flows in the direction of arrow 18, a magnetic field generates a tangential magnetic force having a vector that causes the rotor 12 to rotate about a long axis 22 and in the direction shown by arrow 20. As used herein, the term "long axis" refers to a longitudinal axis, which is parallel with the borehole. The long axis is orthogonal to the transverse axis, which extends from a center of the borehole radially into a surrounding formation. It should be noted that the laminations 16 are oriented along a plane of rotation.

Figure 1B:
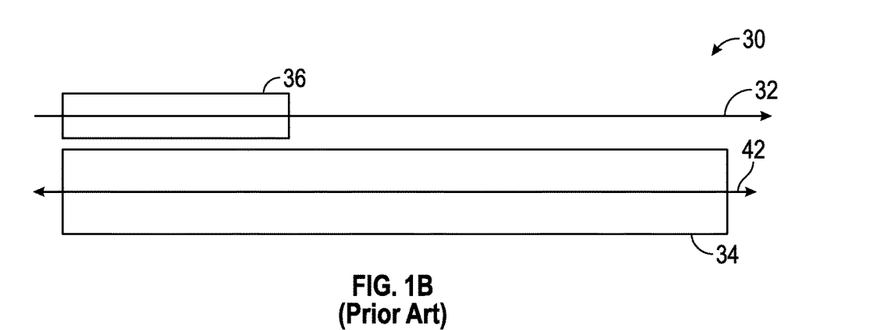
FIGS. 1B-C schematically illustrate a prior art linear motor.

Referring now to FIG. 1B, there is shown a side view of a conventional linear motor 30. The motor 30 is configured to provide linear motion such as that shown by arrow 32. The motor 30 includes a stator 34 and a rotor 36. The rotor 36 includes permanent magnets (not shown). As best shown in an end view of FIG. 1C, the stator 34 has a core formed of laminations 38 and has windings (not shown) that flow positive current in the direction shown by arrow 40. It should be noted that the laminations 38 are oriented along a plane of linear motion 32 (FIG. 1B). In a conventional manner, when current flows in the direction of arrow 40, a magnetic field generates a axial magnetic force having a vector that causes the rotor 12 to translate along a long axis 42 (FIG. 1B) and in the direction shown by arrow 32 (FIG. 1B). The laminations 38 reduce hysteresis and eddy currents resulting from changes in the magnetic flux by providing layers of insulation transversely aligned to the flow of current along the direction of arrow 40.

Figure 1C:
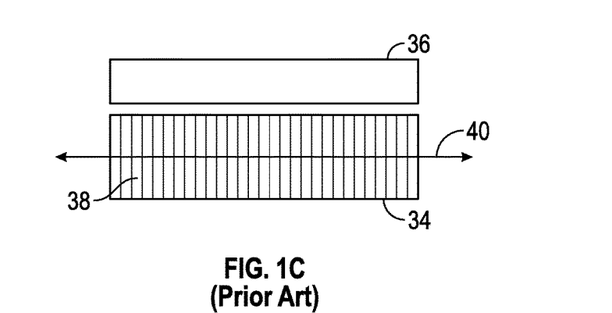
Figure 2A:
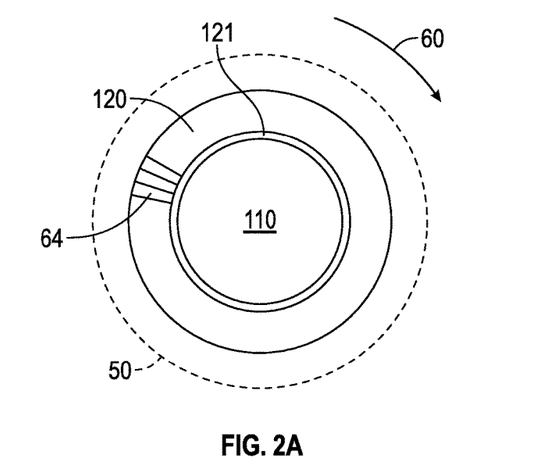
FIGS. 2A-B illustrate one embodiment of a linear motor made in accordance with the present disclosure.

Referring now to FIG. 2A, there is shown a cross-sectional view of a borehole 50 formed in a subsurface formation. Generally speaking, boreholes 50 have a circular shape and typically do not exceed twelve to fourteen inches diameter. Thus, the tooling using in boreholes 50 are compact and have geometries and orientations that can be accommodated in within a cylindrical type of space. The rectangular shapes of linear motors as shown in FIG. 1B and 1C can limit the utility of linear motors in a borehole environment.

Advantageously, linear motors of the present disclosure utilize stator and/or rotor configurations that can generate thrust and/or position tools in a borehole environment. Referring to FIG. 2A, a linear motor 100 according to the present disclosure includes a stator 110 and rotor 120. As shown, the stator 110 may be a cylinder or a tube that is received within a bore 121 of a tubular rotor 120. In an alternative embodiment not shown, the rotor 120 may be a cylinder or a tube that is received within a bore of a tubular stator 110. In either case, the stator 110 includes windings (not shown) that cause positive current to flow in a direction shown by arrow 60. During many subsurface activities, fluids are circulated in the borehole. Thus, the stator 110 may include a bore 65 that serves as a flow path through which drill fluid flows. The bore 65 may also be a volume for receiving equipment such as electrical modules, sensors, controllers, etc.

Figure 2B:
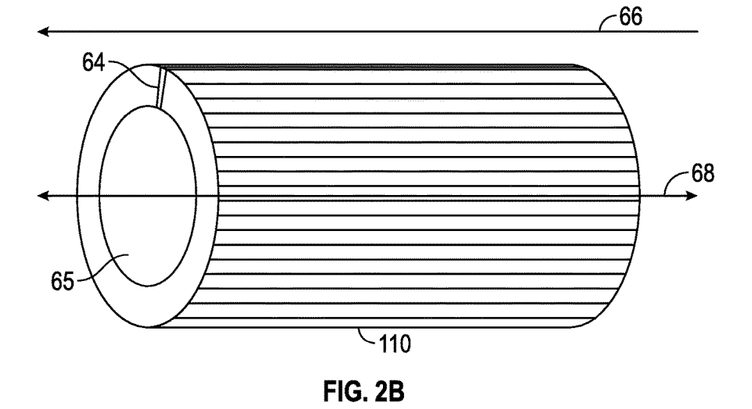
Figure 2C:
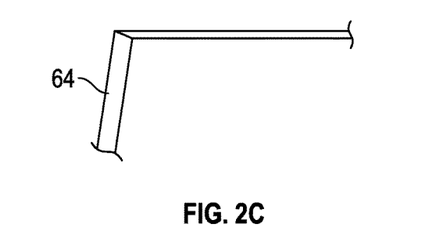
FIG. 2C illustrates one embodiment of a lamination made in accordance with the present disclosure wherein a rotor surrounds a stator.

Referring to FIG. 2A, the stator 110 may be formed of a core 64 that reduces hysteresis and eddy currents resulting changes in the magnetic flux. For example, the core 64 may include layers of insulation transversely aligned to the flow of positive current along the direction of arrow 60. The core 64 may be formed of a sintered material that encapsulates or coats particles of magnetic steel with insulation, by steel laminations, or by any other manufacturing process. As best shown in FIG. 2B, the laminated insulation is aligned with a plane of linear motion of the rotor 120 (FIG. 2A) and which is shown with arrow 66. Referring to FIG. 2C, there is shown a portion of a lamination 64. As can be seen from FIG. 2B-C, the laminations 64 are aligned along a plane that is co-planar with the long axis 68 of the stator 110. It should be understood that a plurality of laminations 64 are circumferentially arrayed to form radial barriers to reduce the circulation of eddy currents.

Referring to FIG. 1A and FIGS. 2A-B, it should be appreciated that the laminations 16 of the rotary motor 10 are transverse to the long axis 22 of the rotor 12 whereas the laminations 64 of the linear motor 100 are parallel with a long axis 68 of the rotor 120. Referring to FIG. 1B-C and FIGS. 2A-B, it should be appreciated that the stator 34 and rotor 36 of a conventional linear motor 30 are have a platen configuration whereas the stator 110 and the rotor 120 of the linear motor 100 are generally circular in shape.

Figure 3:
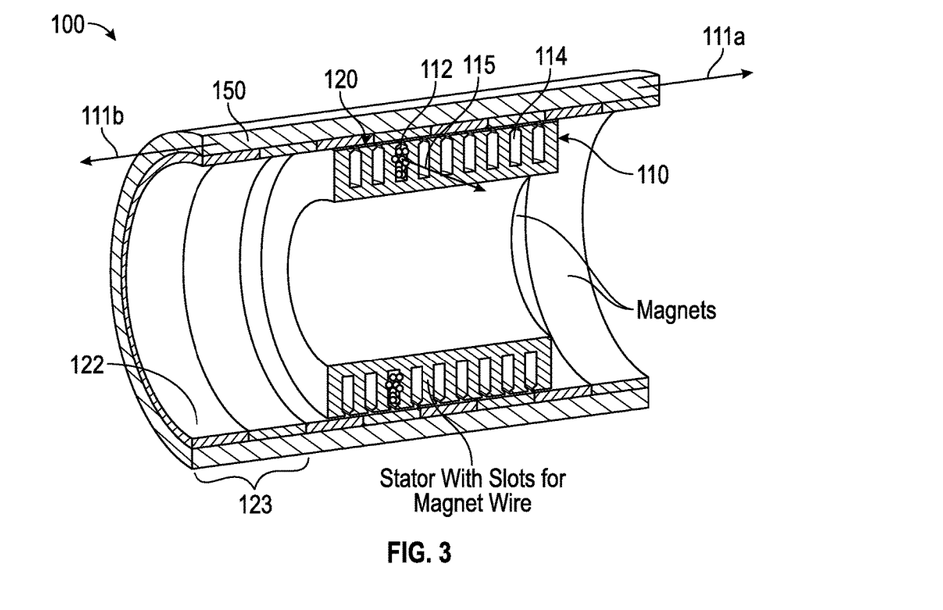
FIG. 3 illustrates one embodiment of a linear motor in accordance with the present disclosure wherein planar bodies are used for magnetic elements and laminated strips.

Referring to FIG. 3, there is shown a linear drive 100 according to one embodiment of the present disclosure. The linear drive 100 includes a stator 110 that is fixed to a tool body (not shown). The stator 110 has an active primary winding (e.g., a three phase winding) that includes magnet wire 112. The flow of current through the windings 112 is shown with arrow 115. The linear drive 100 also includes a rotor 120 that principally moves axially, or translates, along a long axis 68 (FIG. 2B) of the stator 110 along the directions shown by arrows 111a,b. As used herein, the term "principally" means that the magnitude of sliding along the long axis is greater than sliding along any other axis; i.e., the axial sliding movement is greater than any rotational sliding between the stator and the rotor. It should be understood that the relative sliding movement between the stator 110 and the rotor 120 is intentional and of a magnitude sufficient to perform one or more predetermined downhole tasks. As used herein, the term "sliding movement" excludes the "play" or nominal movement between two component, which is not specifically engineered to execute one or more pre-assigned tasks.

The rotor 120 may include one or more sets 123 of fixed permanent magnets 122. Thus, the rotor 120 has no wire connections. The permanent magnets 122 are serially aligned along the long axis 68 (FIG. 2B) and alternate in polarity. In one embodiment, the permanent magnets 112 may be partially or wholly formed of a magnetic material such as Samarium-Cobalt, specifically Sm2Co17.

The stator 110 of FIG. 3 uses radial-type laminations such as the laminations 64 of FIGS. 2B-C. The laminations 114 may be formed by layers, film, sheets, or other thin-bodied media that are circumferentially distributed within the stator 110. The laminations 114 are radially oriented since the magnetic flux runs in a radial direction and the laminations 114 can then effectively decrease eddy currents. As noted above, the laminations 114 are aligned along a plane co-planar with the long axis 68 (FIG. 2B) of the stator 110. By that, it is meant that the relatively larger opposing surfaces are aligned to radiate outward from the long axis 68 (FIG. 2B) and are parallel to a plane that is aligned with the long axis 68 (FIG. 2B). In one embodiment, the laminations 114 may be electrical steel sheets. In order for the radially oriented laminations 64 (FIG. 2B) to be circumferentially distributed, each lamination sheet may have a "pie" or triangular shaped cross-section, much like a sector of a circle.

Figure 4:
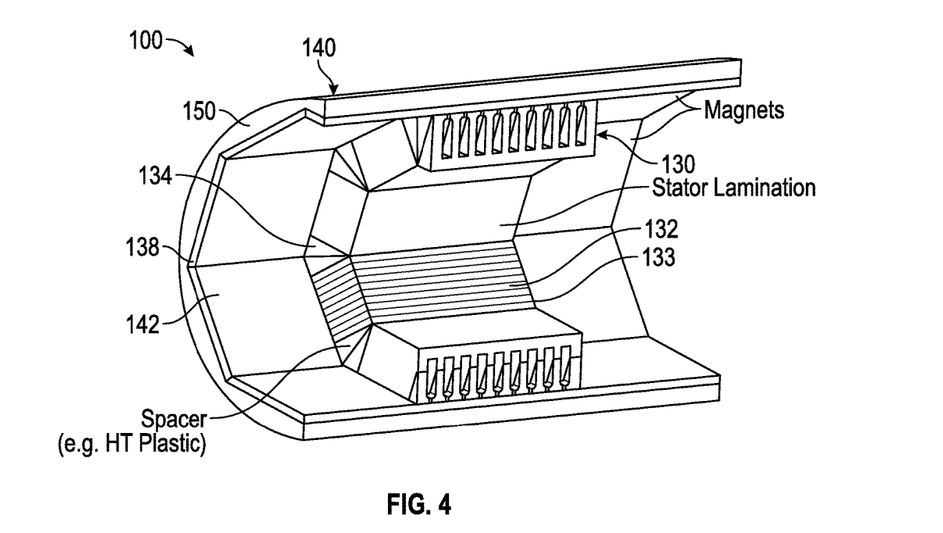
FIG. 4 illustrates one embodiment of a linear motor in accordance with the present disclosure that uses planar elements within the stator and the rotor.

Referring to FIG. 4, there is shown a linear drive motor 100 having a polygon-based stator 130 and an outer rotor 140. The stator 130 may have a plurality of discrete planar elements that meet at edges. The FIG. 4 embodiment allows the permanent magnetic elements 142 of the outer rotor 140 to be planar in shape. By planar, it is meant that the magnetic elements are in the form of plates or other bodies that have at least two parallel surfaces. The magnetic elements 142, which may be magnets, may be axially oriented forming a polygon-shaped cross section with polarity alternating also in the axial direction (not shown in the drawing), which is the direction along the long axis 68 (FIG. 2B). Also, the stator 130 can be assembled using laminated soft magnet material applied in axially oriented strips 132 that form a polygon-shaped cross section. Illustrative laminations are shown with numeral 133. Gaps between each lamination stack strips 132 may be filled with spacers 134 made out of any non-conductive material, e.g. high temperature rated plastics. Also, in some embodiments, the polygon edges 138 between the stator 130 and the movable outer part 140 may be used to position friction reducing elements (not shown) such as bearings, for a check rail, and/or parts of a position sensing system.

In FIGS. 3 and 4, a yoke 150 may be used to support the permanent magnets 122, 142, respectively. While the outer surface of the yoke 150 is depicted as circular, the shape of the yoke 150 may be geometrically varied as needed without any magnetic disadvantages. In one arrangement, the yoke 150 can be a solid piece of magnetic steel since the frequency of the magnetic flux in it is zero. The yoke 150 may be connected to a platform, lever, sleeve, arm, pad, or any other structure that requires displacement during operation. The yoke 150 may ride on rails or a guide that confines movement of the rotor 120 to a pre-determined axial distance. The stator 110 remains stationary relative to the conveyance device (e.g., drill string) to allow the linear motion of the rotor 120. Thus, electrical energy is converted to mechanical energy.

It should be understood that laminations are only one illustrative arrangement for providing insulation to reduce hysteresis and eddy currents. Any construction or material composition that effectively reduces hysteresis and eddy currents may be used. For example, Soft Magnetic Component (SMC) materials, which are a mixture of an epoxy base and granular iron filling, can be used to produce suitable stator profiles.

Figure 5:
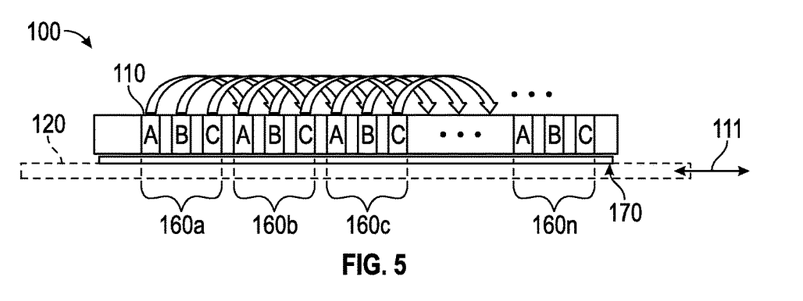
FIG. 5 illustrates one embodiment of linear motor that has an extended displacement in accordance with embodiments of the present disclosure.

Referring to FIG. 5, there is shown further aspects of the linear motor 100 according to embodiments of the present disclosure. The stator 110 may include a plurality of three-phase windings 160a, 160b, 160c to 160n. The linear motor 100 may also include a linear position sensor 170. The linear position sensor 170 may be any type of sensor configured to detect the axial position of the rotor (not shown). Suitable position sensors include, but are not limited to, LVDT sensors, acoustic sensors, optical sensors, capacitive transducers, hall effect sensors, etc. By using sets of windings, the power density of the linear motor 100 may be maintained while increasing the usable axial distance the rotor 120 can translate during operation. That is, if only one winding were used, the number of windings per unit length would decrease and thereby reduce the amount of magnetic force available to displace the rotor 120. As described earlier, the stator 110 is fixed relative to the tool string (not shown) and the rotor 120 moves axially as shown with the arrow having numeral 111.

Figure 6:
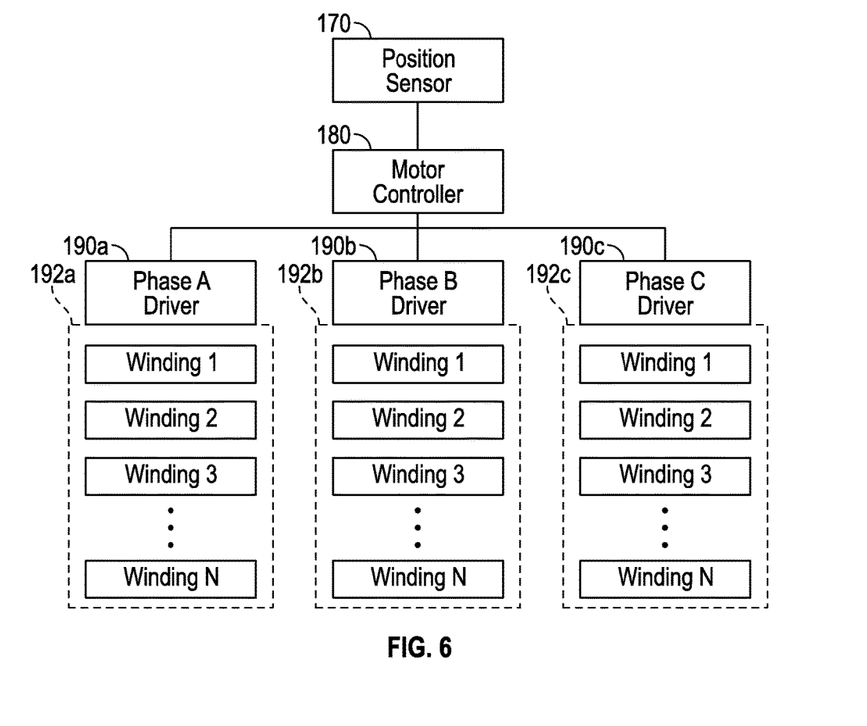
FIG. 6 functionally illustrates a control system for controlling the FIG. 5 embodiment.

Referring to FIG. 6, the linear position sensor 170 transmits information that may be used by a controller 180 to control the linear motor 100. In one arrangement, the controller 180 may use signals from the position sensor 170 to selectively energize phase drivers 190a,b,c. Each phase driver 190a,b,c can selectively and sequentially energize associated windings. For example, phase A driver 190a may sequentially energize a plurality of windings 192a that range from 1 to n. Thus, the controller 180 may be programmed with algorithms to initiate movement or a pattern of movement in response to the received sensor signals. For example, the controller 190 may sequentially energize the phases A-C of the first set of windings, windings 1, and then the phases A-C of the second set of windings, windings 2, etc.

Figure 7:
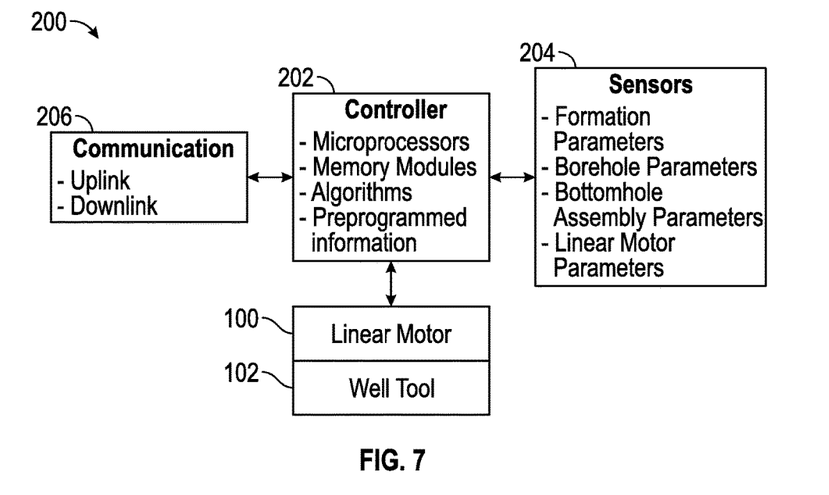
FIG. 7 functionally illustrates a system for deploying a well tool that uses a linear motor made in accordance with embodiments of the present disclosure.

Referring to FIG. 7, there is shown one non-limiting system 200 for using a linear motor 100 in conjunction with a well tool 102 to perform one or more subsurface operations. These operations may be undertaken arise during the drilling, logging, completion, recompletion, workover, remediation, and/or abandonment of a well. The tasks may also arise while the well is producing fluids such as liquid and/or gas hydrocarbons. To perform these operations, the system 200 may include a controller 202, one or more sensors 204, and a communication link 206.

The controller 202 may include known devices such as one or more microprocessors for processing information, memory modules for storing data, simulation models for predicting system behavior, communication modules for exchanging information other equipment, and associated algorithms. The controller 202 may be programmed to operate the linear motor 100 according to any number of operating regimes. In one arrangement, the controller 202 may operate the linear motor 100 autonomously according to pre-programmed instructions and optionally pre-programmed information. In another arrangement, the controller 202 may operate the linear motor 100 using instructions transmitted from a remote location such as the surface. In still another arrangement, the controller 202 may operate the linear motor 100 using information that has been acquired during deployment in the borehole. Of course, other arrangements can include hybrids that blend autonomous control with surface control. The components and devices of the system 200 depend on the type of operating regime used.

For instance, the controller 200 may be programmed to use information acquired from one or more sensors 204 to control the linear motor 100. The sensors 204 may be configured to acquire subsurface data; i.e., data relating to any subsurface feature or equipment of interest, including but not limited to a bottomhole assembly (BHA), the formation, downhole fluids, or the borehole. Data relating to the BHA include parameters relating to the state, condition, or health of the various components of the BHA, such as the drill bit wear, differential pressure across the mud motor, pressure and temperature profiles, vibration, whirl, torque, he drilling fluid flow rate, drill bit rotary speed, torque, and weight-on-bit or the thrust force on the bit ("WOB") etc. Data relating to the formation include parameters such as formation resistivity, formation porosity, formation density, formation permeability, rock composition, lithological characteristics of the formation and other formation related parameters. etc. Data relating to downhole fluids include parameters such as viscosity, compressibility, density, chemical composition (gas, water, oil and methane contents, etc.). Data relating to borehole include parameters include borehole size, roughness and cracks. Data relating to the direction borehole include parameters such as position, inclination and direction of the BHA or drill bit.

Based on the received sensor information, the controller 200 may activate or de-activate the linear motor 100, alter the behavior of the linear motor 100, shift or displace the rotor 120 (FIG. 3) a specified amount, etc. The nature, extent, and frequency of the control will depend on the particular situation encountered and the type of device that incorporates the linear motor 100. The controller 202 may control the linear motor 100 autonomously or use a suitable communication link 206 to receive control signals from the surface or some other remote location.

Merely to illustrate the wide range of subsurface applications for linear motors according to the present disclosure, certain non-limiting embodiments useful when thrust generation and/or equipment positioning is useful are described below.

Figure 8:
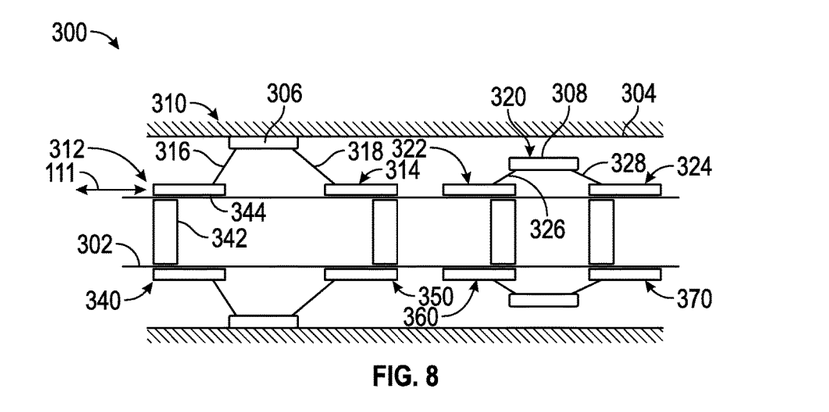
FIG. 8 schematically illustrates a borehole tractor that uses linear motors made in accordance with one embodiment of the present disclosure.

Referring to FIG. 8, there is schematically illustrated one embodiment of a borehole tractor 300 that may be used to move a drill string and/or BHA 302 along a borehole 304. The tractor 200 includes a first drive unit 310 and a second drive unit 320. The first drive unit 310 has a forward actuator 312 for radially displacing a first pad 306 and a rear actuator 314 for radially displacing a second pad 308. The forward and rear actuators 312, 314 each have cooperating contact arms 316, 318. The second drive assembly 220 has a forward actuator unit 322 and a rear actuator 324. The forward and rear actuators 322, 324 each have cooperating contact arms 326, 328. The contact arms 326, 328 are radially extended by reducing the distance between their respective actuators and radially retracted by increasing the distance between their respective actuators.

Each of the actuators 312, 314, 322, 324 includes a linear motor 340, 350, 360, and 370, respectively. For brevity, only linear motor 340 will be described. Linear motor 340 includes a stator 342 and a rotor 344 as previously described. In this arrangement, the stator 342 is disposed inside the rotor 344. The stator 342 is fixed to the BHA 302 and remains stationary when the linear motor 340 generates thrust. The rotor 344 may be mounted on a suitable guide (not shown) that is translated (displaced axially) relative to the stator 342 in the directions of arrow 111 when the linear motor 340 is energized. The contact arm 316 uses the motion of the rotor 344 to radially displace the first pad 306 as discussed in greater detail below.

The forward actuator 312 is constructed so the pad 306 is extended radially outward when one rotor of the linear motors 340 and 350 slides toward the other, or both rotors slide toward the other. The pad 306 radially retracts when one rotor of the linear motors 340 and 350 slide away from the other, or both rotors slide way from one another. By sequentially, engaging the disengaging the pads 306 and 308, the tractor 300 may propel the BHA 302 along the borehole 302.

The drive units 310, 320 can be activated in an alternating, caterpillar-like movement sequence that allows continuous movements at less than maximum force as less than all of the drive units 310, 320 are active at a given point in time. Alternatively, by operating both drive units 310, 320 at the same time, the traction force and the thrust force can be maximized. The tractor 300 may have one drive unit or three or more drive units. It should be appreciated that the tractor 300 is highly modular and can comprise as many drive units as required for a requested operational pulling force. It should be appreciated that the tractor 300 may be used to generate a local weight on bit (WOB) for a drill bit 420 (FIG. 9).

The tractor 100 may also include other features such as stabilizing wheels or centralizers for guiding the tractor 100 through a borehole tubular or open hole section. The tractor 100 may also be used in conjunction with a downhole assembly that includes directional sensors, controllers, bi-directional communication systems, electrical power generators, batteries, etc.

Figure 9:
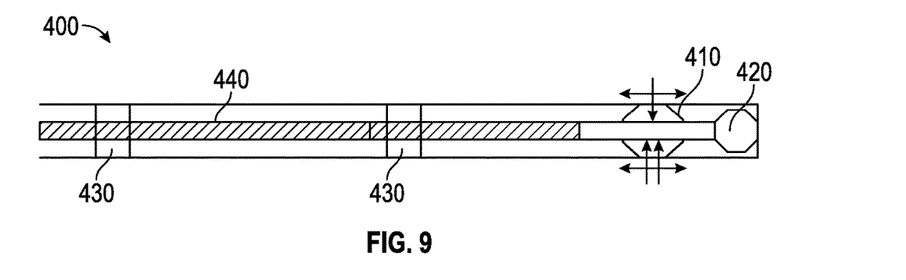
FIGS. 9 and 10 schematically illustrate a thrust generator that uses a linear motor made in accordance with one embodiment of the present disclosure.

Referring now to FIG. 9, there is shown a bottomhole assembly (BHA) 400 that uses a linear motor 100 for actuating a directional thruster 410 that selectively positions well equipment such as a drill bit 420. As used herein, the BHA refers to any equipment run in a borehole including, but not limited to, production logging tools, well intervention tools, directional sondes, formation testing or sampling instruments, or formation evaluation tools. The BHA 300 may include one or more centralizers 430 that support a conveyance device such as drill string 440. The centralizers 430 may be fixed or rotate relative to the conveyance device 340. The centralizers 430 may be fixed blade or adjustable stabilizers or rollers. The conveyance device 440 may perform electrical and mechanical functions and be formed of drill pipe with mud telemetry, rigid carriers, wired pipe, coiled tubing, wired tubing, non-rigid carriers, wireline, electric line (e-line), slick line.

Figure 10:
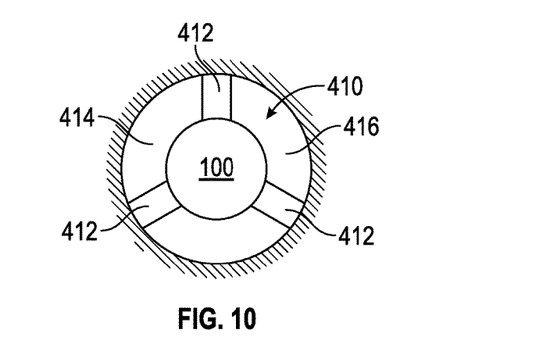

Referring to FIG. 10, there is shown an end view of a directional thruster 410. The directional thruster 410 may be formed to include extensible pads such as the pad 306 and 308. The directional thruster 410 may be formed on a sleeve that can remain relatively rotationally stationary with respect to a borehole wall 414 while the drill string on which it is mounted rotates. These sleeves are sometimes referred to as a non-rotating sleeve. A non-rotating sleeve may also be used for other tools incorporating the linear motor. In one embodiment, the directional thruster 410 may have one or more arms 412 that can be individually or collectively extended into contact with a borehole wall 414. As shown, the directional thruster 410 has three arms 412 spaced circumferentially at one hundred twenty degree intervals. The linear motor 100 may be used to actuate the arms 412 as described with the thruster 300 of FIG. 8. In some embodiments, each of the arms 412 may be actuated with a separate motor. Thus, each arm 412 may be extended a different radial distance. The independent action of the arms 412 allow the BHA 400 (FIG. 9) to be eccentrically positioned in the borehole 416. This eccentric positioning can be used to "point" the drill bit 420 (FIG. 9) in a desired direction for drilling or position a sensor to optimally measure one or more parameters relating to the formation, borehole 416, a borehole tubular such as casing (not shown). Additionally, the directional thruster 410 may also generate an axial thrust while steering the drill bit 420 (FIG. 9) in a desired direction.

In variant, the embodiment of FIG. 10 may be configured as an underreamer. In such embodiments, one or more of the arms 412 may have a cutter or cutting element for cutting, fracturing, or disintegrating the borehole wall 414. The rotors may be used to slide the arms over ramps that force the cutting elements radially outward. The linear motor 100 may be used to actuate the arms 412 in unison or independently.

In other embodiments not shown, the linear motor 100 may be used to actuate pumps that may be used to extract fluids out of a borehole. These pumps may be used to produce hydrocarbons or remove produced liquids such as water or brine. In still other embodiments, the linear motor 100 may be used to operate well intervention tools. For example, the linear motor 100 may be used to extend gripping elements or other engagement devices that interact with well equipment. These gripping elements may be used to extract tooling or well tubulars, "fish" equipment from a well, actuate sliding sleeves, displace a swaging device, activate reamers/underreamers/core sampling tools, valve actuators, activate or de-activate a packing element. More generally, the linear motor 100 may actuate a well tool that manipulates a subsurface feature in some manner. The subsurface feature may be naturally occurring (rock or earth) or an engineered feature (e.g., tubing, a latch, etc.).

While the foregoing disclosure is directed to the one mode embodiments of the disclosure, various modifications will be apparent to those skilled in the art. It is intended that all variations within the scope of the appended claims be embraced by the foregoing disclosure.

The invention claimed is:
1. An apparatus for use in a borehole, comprising:
a bottomhole assembly configured to be disposed in the borehole;
a yoke disposed along the bottomhole assembly;
a rotor having at least one set of magnetic elements, wherein a polarity of each magnetic element is arranged to alternate along a long axis of the rotor; and
a cylindrical stator inside and in sliding engagement with the rotor, the stator having a winding flowing current in a direction transverse to a long axis of the stator, the stator having a core formed at least partially of laminations aligned along a plane co-planar with the long axis of the stator,
wherein energizing the winding causes relative sliding between the rotor and the stator, the sliding being principally along the long axis of the rotor; and
wherein the core includes a plurality of circumferentially distributed planar strips, each strip being formed of the laminations.

2. The apparatus of claim 1, wherein the core is at least partially formed of a mixture of an epoxy base and granular iron filling.

3. The apparatus of claim 1, wherein the magnetic elements of the same polarity are formed as planar bodies that are circumferentially distributed within the rotor.

4. The apparatus of claim 1, wherein the stator includes at least one multiphase winding serially arranged along a long axis of the stator, and further comprising:
at least one multiphase driver associated with the at least one multiphase winding;
at least one position sensor estimating a position of the rotor relative to the at least one multiphase winding; and
a controller using information from the at least one position sensor to activate the at least one multiphase driver and sequentially energize the at least one multiphase winding.

5. The apparatus of claim 1, wherein the stator includes a plurality of multiphase windings serially arranged along a long axis of the stator, and further comprising:
at least one multiphase driver associated with the plurality of multiphase windings;
at least one position sensor estimating a position of the rotor relative to the plurality of multiphase windings; and
a controller using information from the at least one position sensor to activate the at least one multiphase driver and sequentially energize each of the plurality of multiphase windings.

6. The apparatus of claim 1, further comprising:
at least one sensor estimating a subsurface parameter of interest; and
at least one controller using information from the at least one sensor to control the linear motor.

7. The apparatus of claim 1, further comprising a bottomhole assembly including at least one pad engaging a borehole wall, wherein the rotor is operatively connected to the at least one pad, and wherein axial displacement of the rotor radially displaces the at least one pad.

8. The apparatus of claim 1, wherein the rotor includes a bore for receiving the stator.

9. An apparatus for use in a borehole, comprising:
a bottomhole assembly configured to be disposed in the borehole;
a yoke disposed along the bottomhole assembly;
a rotor having at least one set of magnetic elements, wherein a polarity of each magnetic element is arranged to alternate along a long axis of the rotor; and
a cylindrical stator inside and in sliding engagement with the rotor, the stator having a winding flowing current in a direction transverse to a long axis of the stator, the stator having a core formed at least partially of laminations aligned along a plane co-planar with the long axis of the stator,
wherein energizing the winding causes relative sliding between the rotor and the stator, the sliding being principally along the long axis of the rotor, wherein the core includes a plurality of circumferentially distributed planar strips, each strip being formed of the laminations, and further comprising a plurality of circumferentially distributed non-conductive spacers, wherein at least one of the plurality of non-conductive spacers separates at least two of the plurality of planar strips.

10. A method for performing an operation in a borehole, comprising:
forming a well tool with at least one linear motor, wherein the linear motor includes:
a yoke disposed inside the well tool and connected to a displaceable structure associated with the well tool;
a rotor having at least one set of magnetic elements fixed to the yoke, wherein a polarity of each magnetic element is arranged to alternate along a long axis of the rotor, and
a cylindrical stator inside and in sliding engagement with the rotor, the stator having a winding flowing current in a direction transverse to a long axis of the stator, the stator having a core formed at least partially of laminations aligned along a plane co-planar with the long axis of the stator, wherein energizing the winding causes relative sliding between the rotor and the stator, wherein the sliding is principally along the long axis of the rotor, wherein the core includes a plurality of circumferentially distributed planar strips, each strip being formed of the laminations;
conveying the well tool into the borehole; and
operating the well tool by activating the linear motor.

11. The method of claim 10, wherein the stator includes at least one multiphase winding serially arranged along a long axis of the stator, and at least one phase driver associated with the at least one multiphase windings, and further comprising:
estimating a position of the rotor relative to the at least one multiphase winding; and
sequentially energizing each winding of the at least one multiphase winding with a controller that uses information from the at least one position sensor to activate the at least one phase driver.

12. The method of claim 10, further comprising: using at least one position sensor.

13. The method of claim 10, further comprising:
estimating a subsurface parameter of interest using at least one sensor; and
controlling the linear motor with at least one controller that uses information from the at least one sensor.

14. The method of claim 10, wherein the well tool is a tractor, and further comprising:
moving a bottomhole assembly through the borehole using the tractor.

15. The method of claim 10, wherein the well tool is a thruster, and further comprising:
applying a weight on a drill bit using the thruster.

16. The method of claim 10, wherein the well tool is a well intervention tool, and further comprising:
manipulating a subsurface feature using the well intervention tool.

17. The method of claim 10, wherein the well tool is a pump, and further comprising:
conveying a fluid using the pump.

18. The method of claim 10, wherein the well tool is a sensor assembly, and further comprising:
adjusting a position of the sensor assembly using the linear motor.

19. The method of claim 10, wherein the well tool is an underreamer, and further comprising:

extending at least one cutter into cutting engagement with a borehole wall using the linear motor.

* * * * *